United States Patent
Cotter (10) Patent No.: US 9,461,918 B2
(45) Date of Patent: Oct. 4, 2016

(54) MULTI-CARRIER LOAD-BALANCING

(71) Applicant: ARRIS Enterprises, Inc., Suwanee, GA (US)

(72) Inventor: Anthony J. Cotter, Ballincollig (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 291 days.

(21) Appl. No.: 14/251,944

(22) Filed: Apr. 14, 2014

(65) Prior Publication Data

US 2015/0295832 A1 Oct. 15, 2015

(51) Int. Cl.
| | |
|---|---|
| H04L 12/803 | (2013.01) |
| H04L 12/70 | (2013.01) |
| H04L 12/801 | (2013.01) |
| H04L 12/851 | (2013.01) |
| H04W 28/08 | (2009.01) |
| H04W 28/20 | (2009.01) |

(52) U.S. Cl.
CPC ........... H04L 47/125 (2013.01); H04L 47/127 (2013.01); H04L 47/2483 (2013.01); H04W 28/085 (2013.01); H04W 28/20 (2013.01)

(58) Field of Classification Search
None
See application file for complete search history.

(56) References Cited

U.S. PATENT DOCUMENTS

| | | | | |
|---|---|---|---|---|
| 2004/0109428 A1* | 6/2004 | Krishnamurthy | ....... | H04L 47/14 370/338 |
| 2005/0259586 A1* | 11/2005 | Hafid | .................. | H04L 12/5695 370/241 |
| 2006/0140115 A1* | 6/2006 | Timus | .................... | H04L 47/10 370/230 |
| 2008/0159210 A1* | 7/2008 | Zaks | .................... | H04W 72/06 370/329 |
| 2010/0195610 A1* | 8/2010 | Zhong | ................. | H04L 65/1016 370/329 |
| 2012/0076204 A1* | 3/2012 | Raveendran | ... | H04N 21/234327 375/240.12 |
| 2012/0236712 A1 | 9/2012 | Park et al. | | |

OTHER PUBLICATIONS

PCT Search Report & Written Opinion, Re: Application No. PCT/US2015/022149; dated Jul. 2, 2015.

* cited by examiner

Primary Examiner — Brandon Renner
(74) Attorney, Agent, or Firm — Bart A. Perkins (57) ABSTRACT

Methods, systems, and computer readable media can be operable to perform load-balancing across a plurality of channels based upon a likelihood of a load imbalance occurring across the plurality of channels. Service flows can be configured to use one or more channels of a plurality of channels based upon determinations of a minimum and/or a maximum bandwidth potential of each of the plurality of channels.

13 Claims, 7 Drawing Sheets

MULTI-CARRIER LOAD-BALANCING

TECHNICAL FIELD

This disclosure relates to multi-carrier load-balancing.

BACKGROUND

When multiple channels (e.g., carriers, links, etc.) are used to transmit packets from a source to a destination over a shared medium, packets need to be distributed evenly so as to spread the load. The distribution of packets over such a shared medium can become complicated when each of one or more service flows (e.g., flows of data packets categorized by type, quality of service, and/or level of priority) can access only a subset of a plurality of channels. For example, such a scenario can create the potential for the overloading of channels that are being accessed by too many service flows and the under-utilization of channels that are being accessed by only a few service flows. An under-utilized channel is in danger of having nothing to send, and an over-utilized channel is in danger of being overwhelmed with flows trying to send data on it.

Typical, load-balancing algorithms use the number of service flows on each channel and/or the current bitrate of each channel as the criteria for assigning service flows to use one or more of a plurality of channels in order to balance the load across the plurality of channels. Using these criteria requires detection that a channel is not fully utilized before deciding to make a change, and it generally takes time to change the channels assigned to service flows. Therefore, using typical load-balancing algorithms, there will always be some unused bandwidth on some channels. Furthermore, time constraints can negatively impact the effectiveness of typical load-balancing algorithms. For example, the desired load balance across channels can quickly change, and when a load-balancing scheme is reliant on the detection of a channel being over-utilized or under-utilized, a less than desirable balance can result when load-balancing occurs too slowly or if it takes too long to alter the channels which are used by a service flow. Therefore, it is desirable to improve upon systems and methods for load-balancing across channels.

BRIEF DESCRIPTION OF THE DRAWINGS

Like reference numbers and designations in the various drawings indicate like elements.

DETAILED DESCRIPTION

Disclosed herein are techniques for performing load-balancing across a plurality of channels based on the likelihood of an imbalance occurring. In embodiments, the load resulting from one or more service flows can be balanced across a plurality of channels based upon a determination of the maximum bandwidth potential (e.g., the bandwidth that would result on a channel if each of one or more service flows using the channel were limited to only using said channel) and/or minimum bandwidth potential (e.g., the bandwidth that would result on a channel if the bandwidth associated with each of the one or more service flows using the channel was spread evenly across each channel that the service flow is using) of each of the plurality of channels.

Performing load-balancing based upon the likelihood of an imbalance occurring can allow a group or set of channels to operate at a higher utilization because load-balancing is accomplished before any particular channel becomes under-utilized. Furthermore, by balancing a load based upon the likelihood of an imbalance occurring, a load-balancing module does not have to continually check each of a plurality of channels for unused capacity, thereby reducing the number of required service flow reconfigurations. In embodiments, during the load-balancing processes disclosed herein, service flows can be spread across a plurality of channels in order to balance the number of service flows that are using each channel. For example, if a first service flow has a high bitrate and is moved from a first channel to a second channel, then a second service flow having a low bitrate can be moved from the second channel to the first channel so that there is not a net change in the number of service flows on either channel.

Figure 1:
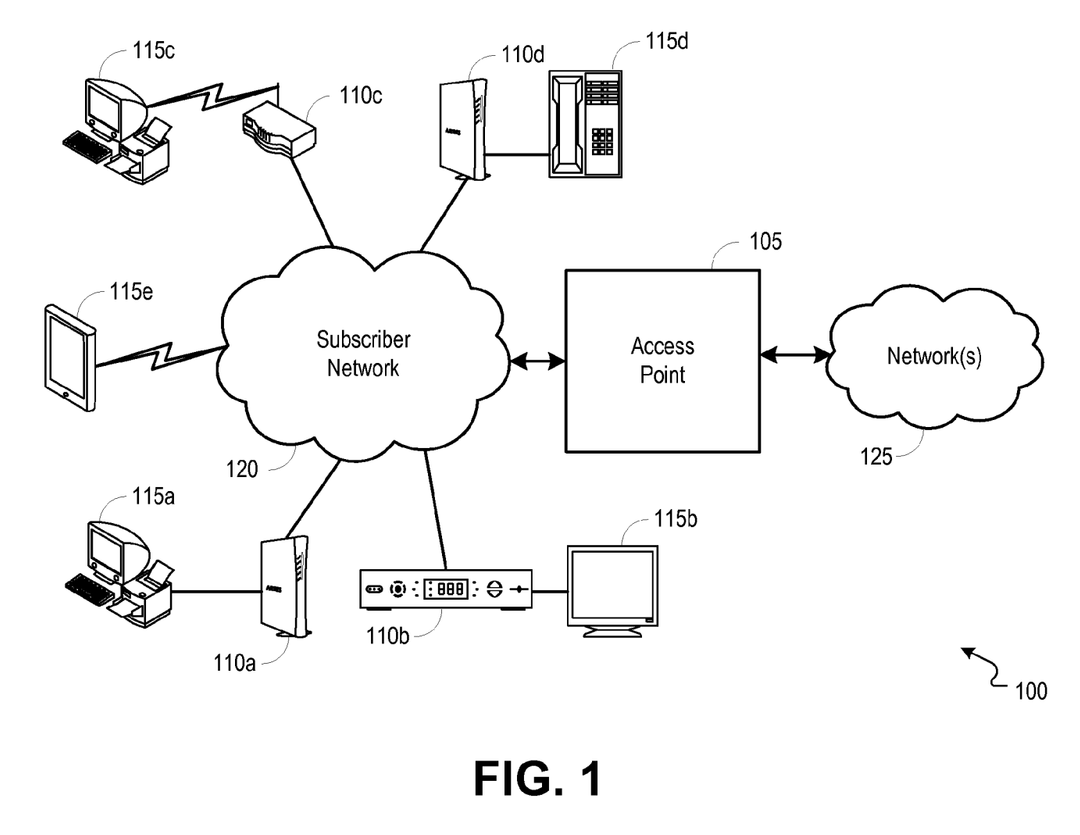
FIG. 1 is a block diagram illustrating an example network environment operable to perform load-balancing across a plurality of channels based upon bitrates of service flows using the plurality of channels.

FIG. 1 is a block diagram illustrating an example network environment 100 operable to perform load-balancing across a plurality of channels based upon a likelihood of a load imbalance occurring across the plurality of channels. In embodiments, an access point 105 can provide video service(s), voice service(s) and/or data service(s) to customer premise equipment (CPE) devices 110a-d in one or more subscriber groups (e.g., service group(s)). The CPE devices can include, for example, a cable modem 110a, a set-top box 110b, a wireless router including an embedded cable modem 110c, or a media terminal adapter (MTA) 110d, among many others (e.g., digital subscriber line (DSL) modem, voice over internet protocol (VOIP) terminal adapter, video game console, digital versatile disc (DVD) player, communications device, tablet, multimedia over coaxial alliance (MoCA) node, etc.). The CPE devices can facilitate communications between the access point 105 and client devices 115a-e. A cable modem or embedded MTA (eMTA) 110a can facilitate communications from the headend 105 to a computer 115a. A set-top box 110b can facilitate communications from the headend 105 to a television 115b or a digital video recorder (DVR). A wireless router 110c can facilitate wireless communications between a computer 115c and a headend 105. An MTA 110d can facilitate communications between a telephone 115d and a headend 105. In embodiments, an access point 105 can provide video service(s), voice service(s) and/or data service(s) to a mobile device 115e and/or other wireless devices.

The CPE devices 110a-d and the mobile device 115e can communicate with the access point 105 via a subscriber network 120. In embodiments, the subscriber network 120 can be a network that facilitates channel bonding (e.g., data over cable service interface specification (DOCSIS), MoCA, wireless networks including 4G and long term evolution (LTE), etc.). Channel bonding can be the combining of multiple channels into a single channel, or logical channel. In embodiments, the subscriber network 120 can include coaxial cable using multiple channels at different frequencies, optical fiber using multiple channels at different wavelengths, twisted pairs using multiple channels at different frequencies, air using multiple channels at different frequencies, and others.

The access point 105 can facilitate communications between one or more network(s) 125 and the CPE devices 110a-d and mobile device 115e. In embodiments, the network(s) 125 can include one or more networks internal to the headend and/or one or more networks external to the headend (e.g., one or more extranets, the Internet, etc.). The network(s) 125, for example, can operate using internet protocol (IP), sending data packets to and receiving data packets from the access point 105. In further examples, one or more video sources may provide streaming data through the network(s) 125 to the access point 105. For example, the access point 105 can receive a variety of service flows from the network(s) 125.

In embodiments, the access point 105 can separate service flows into various channels (e.g., streams or links) to be transmitted (e.g., broadcast, multicast, unicast, etc.) to the CPE devices 110a-d and/or mobile device 115e. For example, each of the various channels can represent a specific bandwidth associated with a medium for transmission (e.g., wireless frequency, DOCSIS channels, optical fiber channels, etc.) of one or more service flows. In embodiments, the access point 105 can separate service flows into one or more logical links (e.g., a specific bandwidth comprising a plurality of links).

In embodiments, the bandwidth of a channel can be made up of contributions from one or more service flows and each service flow can contribute to the bandwidth of one or more channels. Inefficiencies in the transmission of packets across one or more of a plurality of channels can arise when a channel becomes under-utilized or over-utilized. For example, a channel can become under-utilized when the channel has the capacity with which to send more packets, but the one or more service flows that are configured to use the channel are not in need of additional bandwidth with which to send data packets. A channel can become over-utilized when packets associated with one or more service flows cannot be allocated from the channel to another channel.

In embodiments, a more balanced and more efficient transmission of packets across one or more of a plurality of channels can be achieved by calculating how much bandwidth could have been transmitted on each channel in a recent interval and how much bandwidth could not have been transmitted on a different channel. Based upon these calculations, service flows can be configured to use channels in a way that reduces reliance on over-utilized channels and increases use of under-utilized channels. In embodiments, these calculations and configurations can take place at an access point 105.

In embodiments, the bandwidth which is used by a service flow during an interval can be allocated to any of the channels which the service flow is using during the interval, and therefore, if any of the channels used by the service flow become under-utilized, some or all of the service flow's bandwidth, subject to an upper bound of the capacity of the channel, can be allocated to the under-utilized channel. In embodiments, an over-utilized channel can be identified based on a determination of the channel's maximum bandwidth potential (e.g., the total bandwidth that can be targeted at the channel, or in other words, the sum of the bandwidth of all service flows which can use the channel). A channel with a high maximum bandwidth potential can be more likely to have too many service-flows trying to send packets, thus becoming an over-utilized channel. For example, service flows using an over-utilized channel can be limited because of the relatively large number of service flows using the channel. A group of channels can be balanced by configuring service flows to use the group of channels in such a way that the maximum bandwidth potentials of all of the channels of the group of channels are at a similar level.

In embodiments, one or more service flows may be confined to the use of less than all of a group of channels due to hardware limitations, and therefore, it may not be possible to allocate bandwidth associated with these service flows from the channels to other channels. As an example, a service flow which can use two channels has a worst case scenario of having to allocate 50% of its bandwidth to each of the two channels and a service flow which can use N-channels has a worst case scenario of having to allocate (100/N) % of its bandwidth to each of the N-number of channels. For any given service flow, the quotient of the total bandwidth required by the service flow divided by the number of channels available to the service flow can be referred to as the average allocated bandwidth of the service flow. In embodiments, an under-utilized channel can be identified based on a determination of the channel's minimum bandwidth potential (e.g., the total bandwidth that cannot be allocated away from the channel, or in other words, the sum of the average allocated bandwidths of all service flows which can use the channel). In embodiments, an under-utilized channel can, at times, be operating at a less than optimal level because of the relatively small number of service flows using the channel. In embodiments, an under-utilized channel can support the addition of one more service flows. A group of channels can be balanced by configuring service flows to use the group of channels in such a way that the minimum bandwidth potentials of all of the channels of the group of channels are at a similar level. In embodiments, the efficiency of a system can be improved by moving a service flow from an over-utilized channel (e.g., a channel having a relatively high maximum bandwidth potential) to an under-utilized channel (e.g., a channel having a relatively low minimum bandwidth potential).

Figure 2:
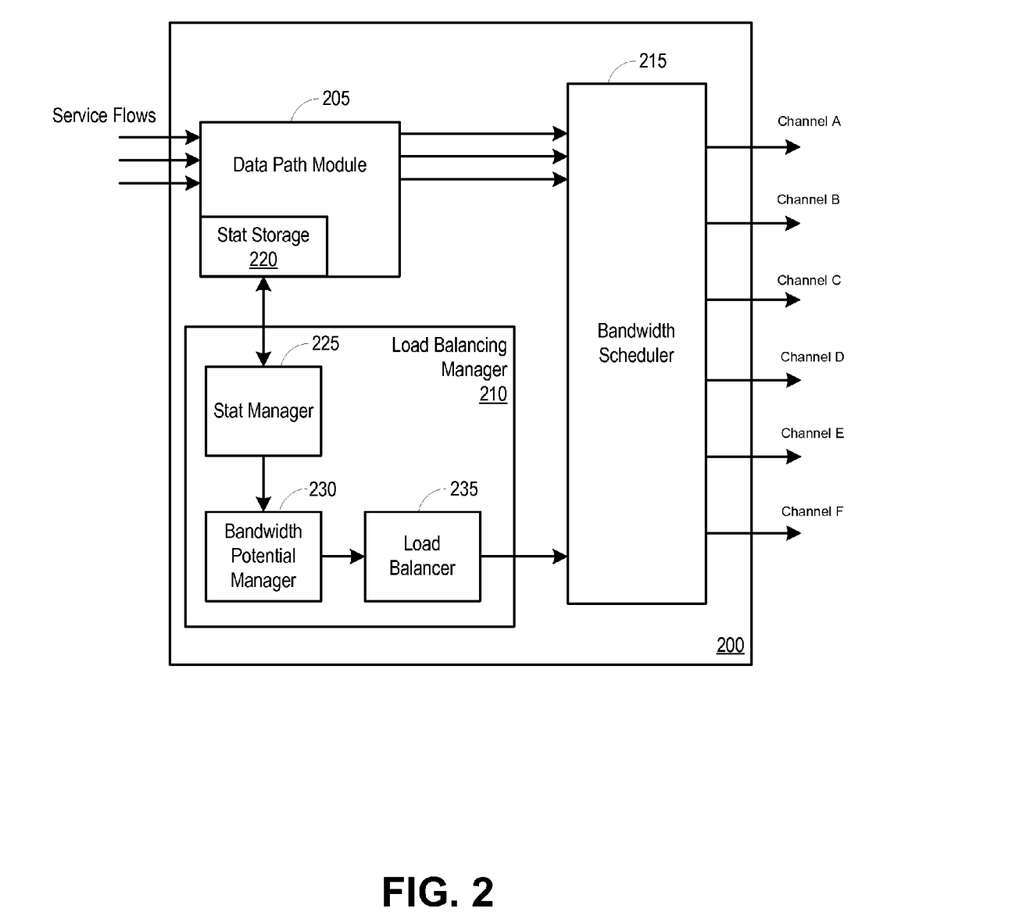
FIG. 2 is a block diagram illustrating an example CMTS operable to perform load-balancing across a plurality of channels based upon bitrates of service flows using the plurality of channels.

FIG. 2 is a block diagram illustrating an example component 200 operable to perform load-balancing across a plurality of channels based upon a likelihood of a load imbalance occurring across the plurality of channels. The component 200 can include a data path module 205, a load balancing manager 210, and a bandwidth scheduler 215. In embodiments, the component 200 can be located at or within an access point (e.g., access point 105 of FIG. 1).

In embodiments, one or more service flows can be received by the component 200 and can pass through a data path module 205. The data path module 205 can be operable to count the number of bytes associated with each of the one or more service flows. In embodiments, the data path module 205 can comprise a stat storage 220. The stat storage 220 can store and maintain a count of the number of bytes associated with the one or more service flows that pass through the data path module 205. In embodiments, the stat storage 220 can associate the byte count of each service flow with a time reference and/or a time interval. For example, the stat storage 220 can maintain a total count of the number of bytes associated with each service flow and can flag the count of the number of bytes as of the end and/or the start of each time interval. As another example, the stat storage 220 can maintain a count of the number of bytes associated with each service flow for a predetermined interval and can reset the count at the end of said interval. The one or more service flows can be passed from the data path module 205 to a bandwidth scheduler 215.

In embodiments, a load balancing manager 210 can comprise a stat manager 225, a bandwidth potential manager 230 and a load balancer 235. The stat manager 225 can retrieve byte counts of one or more service flows from stat storage 220. In embodiments, the stat manager 225 can retrieve byte counts at a predetermined interval. In embodiments, the stat manager 225 can periodically output a count of the number of bytes associated with a service flow that are received by the data path module 205 over a predetermined interval. For example, the stat manager 225 can determine the number of bytes associated with a service flow that are received by the data path module 205 over a predetermined interval by subtracting the count of the number of bytes associated with the service flow as of the start of the present interval from the count of the number of bytes associated with the service flow as of the end of the present interval.

In embodiments, a bandwidth potential manager 230 can calculate a maximum bandwidth potential of one or more channels. The bandwidth potential manager 230 can determine an average bitrate for each service flow by dividing the number of bytes associated with the service flow by a period of time covered by the predetermined interval. In embodiments, the bandwidth potential manager 230 can calculate the maximum bandwidth potential of a channel by summing together the average bitrates of each of the service flows that send packets on the channel.

In embodiments, a bandwidth potential manager 230 can calculate a minimum bandwidth potential of one or more channels. The bandwidth potential manager 230 can determine an average bitrate allocation for each of the service flows by dividing the average bitrate of each service flow by the number of channels that the service flow can use. In embodiments, the bandwidth potential manager 230 can calculate the minimum bandwidth potential of a channel by summing together the average bitrate allocations of each service flow that can send packets on the channel.

In embodiments, a load balancer 235 can associate one or more service flows with one or more channels so as to balance the bandwidth load across a plurality of channels. For example, a channel having the highest maximum bandwidth potential among a plurality of channels can be selected, and the load balancer 235 can then identify one or more high-bitrate service flows which are using this channel and the load balancer 235 can associate the high-bitrate service flows with another channel having a lower maximum bandwidth potential than the identified channel. As another example, a channel having the highest minimum bandwidth potential among a plurality of channels can be selected, and the load balancer 235 can then identify one or more high-bitrate service flows which are using this channel and the load balancer 235 can associate the identified high-bitrate service flows with a channel which has a lower minimum bandwidth potential than the selected channel. In embodiments, the load balancer 235 can output the associations between channels and service flows to a bandwidth scheduler 215.

In embodiments, a bandwidth scheduler 215 can configure service flows to use one or more individual channels (e.g., Channels A-F) or logical channels based upon the maximum and/or minimum bandwidth potentials of the channels. For example, a channel having the highest maximum bandwidth potential among a plurality of channels can be selected, and the bandwidth scheduler 215 can then identify one or more high-bitrate service flows which are using this channel and the bandwidth scheduler 215 can configure or assign the high-bitrate service flows to use another channel having a lower maximum bandwidth potential than the identified channel. As another example, a channel having the highest minimum bandwidth potential among a plurality of channels can be selected, and the bandwidth scheduler 215 can then identify one or more high-bitrate service flows which are using this channel and the bandwidth scheduler 215 can configure or assign the identified high-bitrate service flows to use a channel which has a lower minimum bandwidth potential than the selected channel. In embodiments, the bandwidth scheduler 215 can configure service flows to use one or more channels based upon associations between channels and service flows that are received from a load balancer 235. In embodiments, the bandwidth scheduler 215 can output one or more service flows within one or more a plurality of channels (e.g., Channels A-F).

Figure 3:
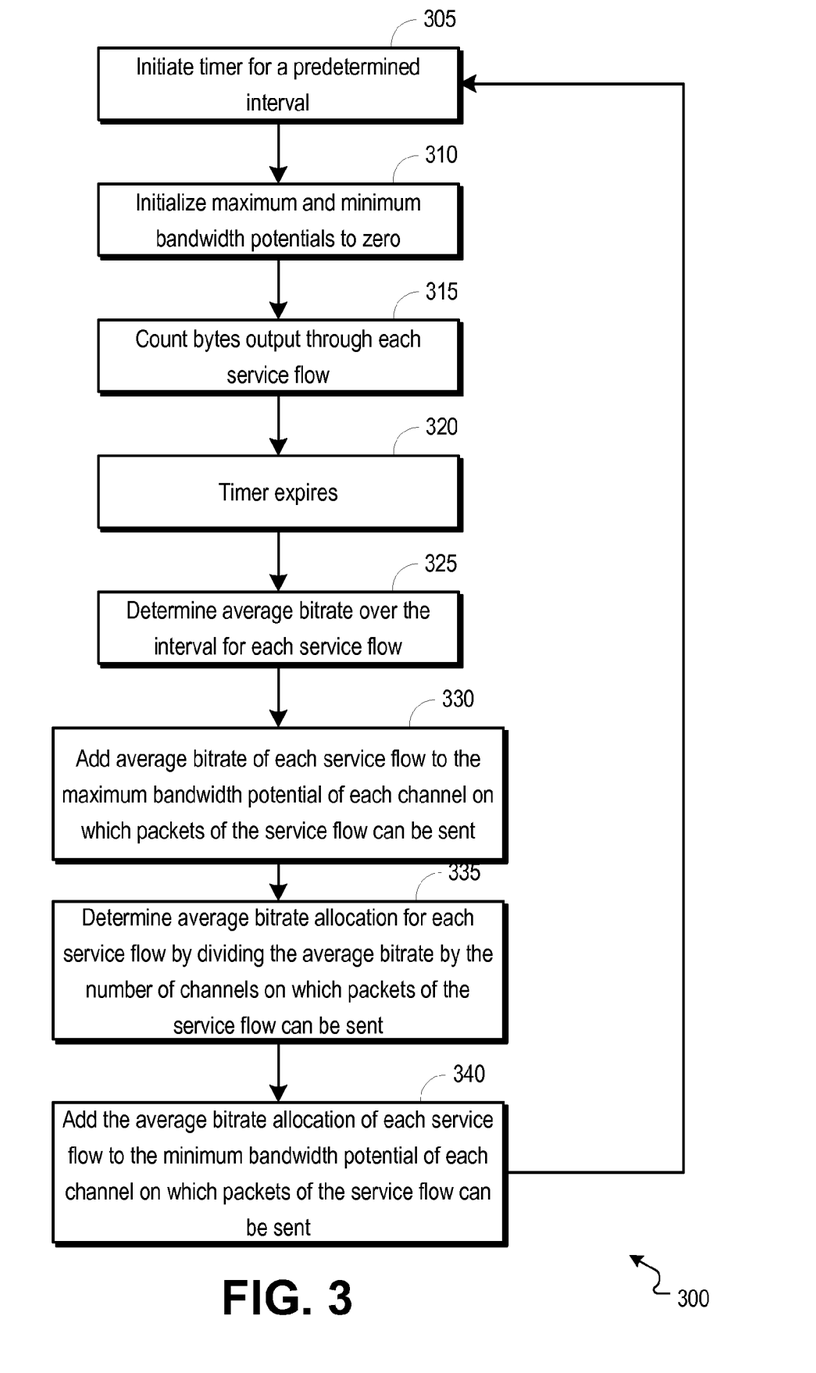
FIG. 3 is a flowchart illustrating an example process operable to calculate a maximum and minimum bandwidth potential of each of a plurality of channels.

FIG. 3 is a flowchart illustrating an example process 300 operable to calculate a maximum and minimum bandwidth potential of each of a plurality of channels over a predetermined interval. In embodiments, the process 300 can be completed by a load balancing manager 210 of FIG. 2. The process 300 can begin at 305, when a timer is initiated for a predetermined interval.

At 310, the maximum and minimum bandwidth potentials for each of the plurality of channels can be initialized at zero. The maximum and minimum bandwidth potentials for each of the plurality of channels can be initialized at zero, for example, by a stat manager 225 of FIG. 2. In embodiments, the stat manager 225 can clear stored values of the maximum and minimum bandwidth potentials of each channel and/or set the stored values of the maximum and minimum bandwidth potentials of each channel to zero when the timer is initiated.

At 315, bytes that are output through each of a plurality of service flows that are using one or more of the plurality of channels can be counted. Bytes can be counted, for example, by stat storage 220 of FIG. 2 and can be retrieved by a stat manager 225 of FIG. 2. In embodiments, a byte count can be maintained for each service flow received. For example, a running byte count can be maintained for each service flow, wherein the byte count for each service flow as of the initiation of the timer can be flagged, and the byte count for each service flow as of the expiration of the timer can be flagged. As another example, the byte count for each service flow can be reset to zero and the byte count can be resumed upon the initiation of the timer.

At 320, the timer can expire. In embodiments, the expiration of the timer can signal a stat storage 220 of FIG. 2 to flag the byte count for each service flow. In embodiments, the expiration of the timer can signal a stat storage 220 to output byte counts for each service flow to a stat manager 225 of FIG. 2. In embodiments, after the byte counts of each service flow is output or is saved, the byte counts of each service flow can be reset.

At 325, an average bitrate over the interval can be determined for each service flow. Average bitrates can be determined, for example, by a stat manager 225 of FIG. 2. In embodiments, the byte count for each service flow over the interval can be read or retrieved (e.g., from a stat storage 220 of FIG. 2). For example, the total number of bytes for each service flow that are counted during an interval can be determined by taking the difference between the number of bytes that are counted as of the beginning of the interval and the number of bytes that are counted as of the end of the interval. As another example, where the byte count for each service flow is reset upon the expiration of a timer, the stat manager 225 can retrieve byte counts for each service flow from stat storage 220, and the byte counts can be equivalent to the number of bytes associated with each service flow that are received during the interval. In embodiments, the stat manager 225 can determine the average bitrate of a service flow by dividing the service flow's byte count for an interval by the time duration of the interval.

At 330, the average bitrate of each service flow can be added to the maximum bandwidth potential of each channel on which packets of the service flow can be sent. The maximum bandwidth potential of each channel can be determined and can be maintained, for example, by a bandwidth potential manager 230 of FIG. 2. In embodiments, the bandwidth potential manager 230 can calculate a channel's maximum bandwidth potential for a given interval by summing together the average bitrates for the given interval of each service flow that can or that was capable of sending packets on the channel during the given interval. In embodiments, a service flow's contribution to a particular channel's maximum bandwidth potential can have an upper limit of the channel's bandwidth capacity.

At 335, an average bitrate allocation can be determined for each service flow. An average bitrate allocation can be determined, for example, by a bandwidth potential manager 230. In embodiments, an average bitrate allocation can be calculated by dividing the average bitrate of a service flow by the number of channels upon which packets of the service flow can be sent.

At 340, the average bitrate allocation of each service flow can be added to the minimum bandwidth potential of each channel upon which packets of the service flow can be sent. The minimum bandwidth potential of each channel can be determined and can be maintained, for example, by a bandwidth potential manager 230 of FIG. 2. After average bitrate allocation(s) are added to the minimum bandwidth potential of each channel, the process 300 can return to 305 where the timer can be initiated for a predetermined interval.

Figure 4:
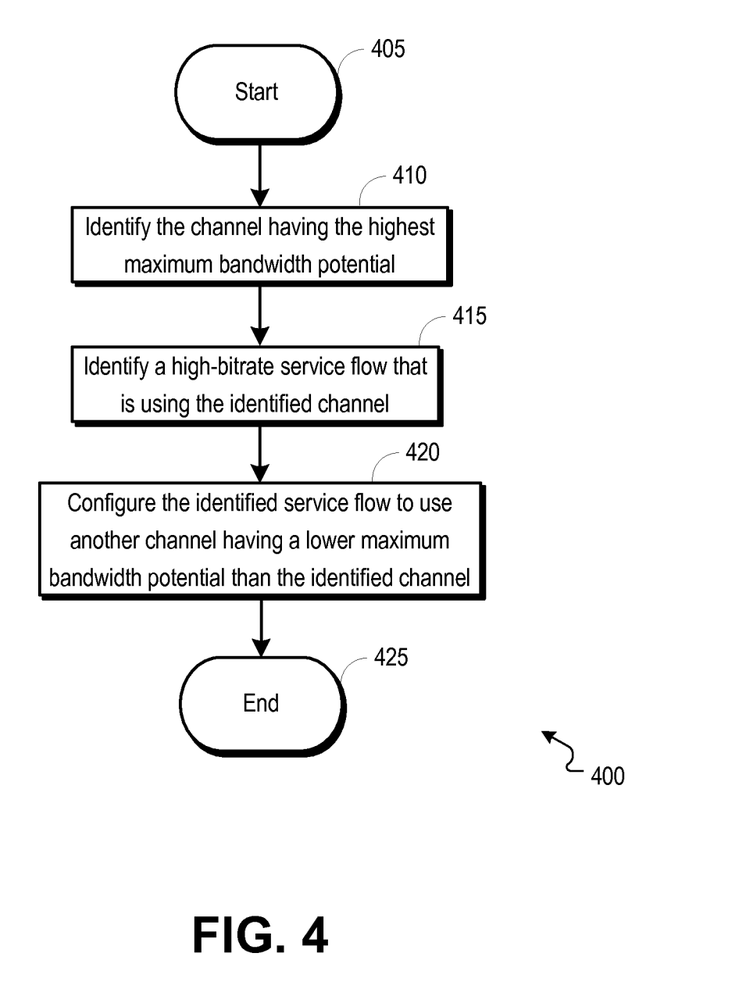
FIG. 4 is a flowchart illustrating an example process operable to perform load-balancing by moving a service flow to a channel having a lower maximum bandwidth potential.

FIG. 4 is a flowchart illustrating an example process 400 operable to perform load-balancing across a plurality of channels by periodically configuring a high-bitrate service flow using a channel having a relatively high maximum bandwidth potential to use a channel having a lower maximum bandwidth potential. The process 400 can begin at 405 when the determination is made to balance a load across a plurality of channels. In embodiments, the process 400 can be repeated until a predetermined condition on the plurality of channels is met. For example, the process 400 can be repeated until the maximum bandwidth potentials of each of the plurality of channels are within a predetermined range of one another. In embodiments, the process 400 can be carried out periodically.

At 410, the channel having the highest maximum bandwidth potential among a plurality of channels can be identified. The channel having the highest maximum bandwidth potential among a plurality of channels can be identified, for example, by a load balancer 235 of FIG. 2.

At 415, a high-bitrate service flow that is using the identified channel but is capable of using a channel with a lower maximum bandwidth potential can be identified. The high-bitrate service flow can be identified, for example, by a load balancer 235 of FIG. 2. In embodiments, it can be determined that a service flow is a high-bitrate service flow based upon a comparison between the service flow's average bitrate and average bitrates of other service flows or a predetermined threshold.

At 420, the identified high-bitrate service flow can be configured to use another channel having a lower maximum bandwidth potential than the identified channel. The identified service flow can be configured to use the other channel, for example, by a bandwidth scheduler 215. In embodiments, a load balancer 235 can associate the identified, high-bitrate service flow with the other channel. In embodiments, a bandwidth scheduler can configure the identified, high-bitrate service flow to send packets on the other channel. After the identified service flow is configured to use the other channel, the process 400 can end at 425.

Figure 5:
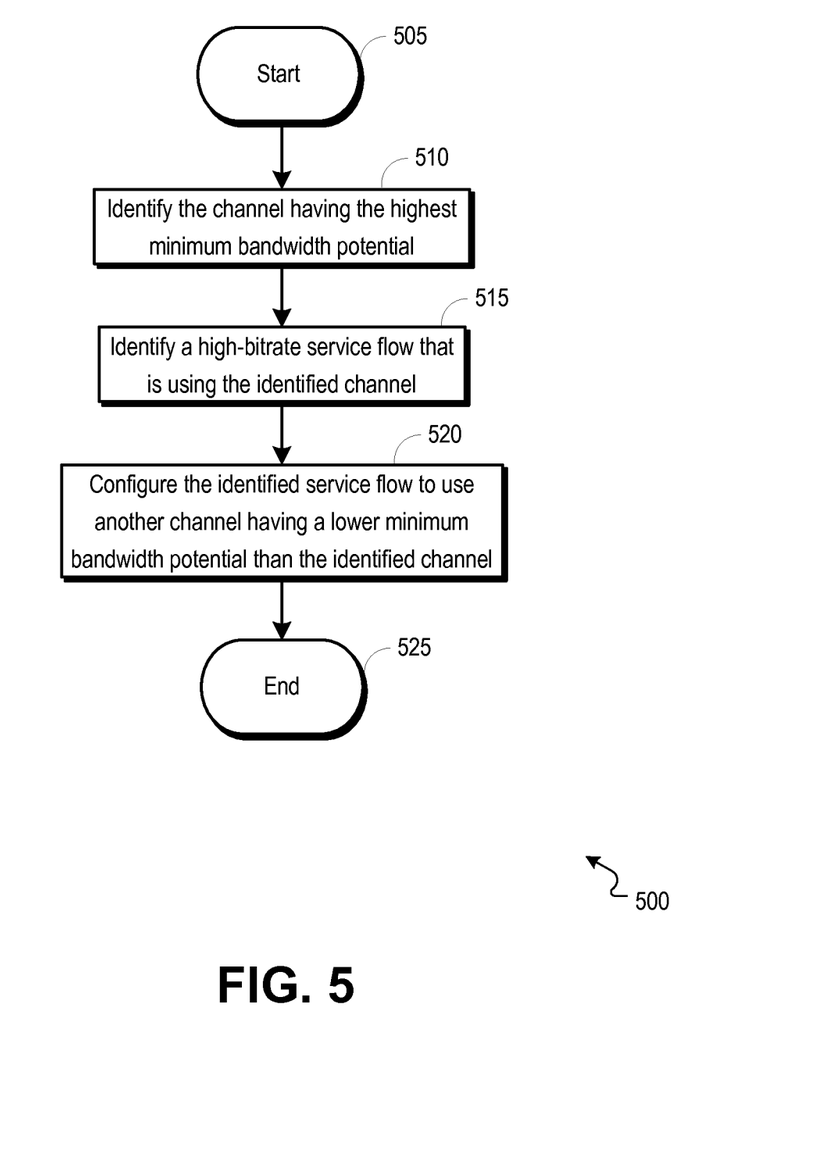
FIG. 5 is a flowchart illustrating an example process operable to perform load-balancing by moving a service flow to a channel having a lower minimum bandwidth potential.

FIG. 5 is a flowchart illustrating an example process 500 operable to perform load-balancing across a plurality of channels by periodically configuring a high-bitrate service flow using a channel having a relatively high minimum bandwidth potential to use a channel having a lower minimum bandwidth potential. The process 500 can begin at 505 when the determination is made to balance a load across a plurality of channels. In embodiments, the process 500 can be repeated until a predetermined condition on the plurality of channels is met. For example, the process 500 can be repeated until the minimum bandwidth potentials of each of the plurality of channels are within a predetermined range of one another. In embodiments, the process 500 can be carried out periodically.

At 510, the channel having the highest minimum bandwidth potential among a plurality of channels can be identified. The channel having the highest minimum bandwidth potential among a plurality of channels can be identified, for example, by a load balancer 235 of FIG. 2.

At 515, a high-bitrate service flow that is using the identified channel can be identified. The high-bitrate service flow can be identified, for example, by a load balancer 235 of FIG. 2. In embodiments, it can be determined that a service flow is a high-bitrate service flow based upon a comparison between the service flow's average bitrate and average bitrates of other service flows or a predetermined threshold.

At 520, the identified, high-bitrate service flow can be configured to use another channel within the plurality of channels, the other channel having a lower minimum bandwidth potential than the identified channel. The identified service flow can be configured to use another channel, for example, by a bandwidth scheduler 215. In embodiments, a load balancer 235 can associate the identified, high-bitrate service flow with the other channel. In embodiments, a bandwidth scheduler can configure the identified, high-bitrate service flow to stop sending packets on the identified channel and to send packets on the other channel. After the identified service flow is configured to use the other channel, the process 500 can end at 525.

Figure 6:
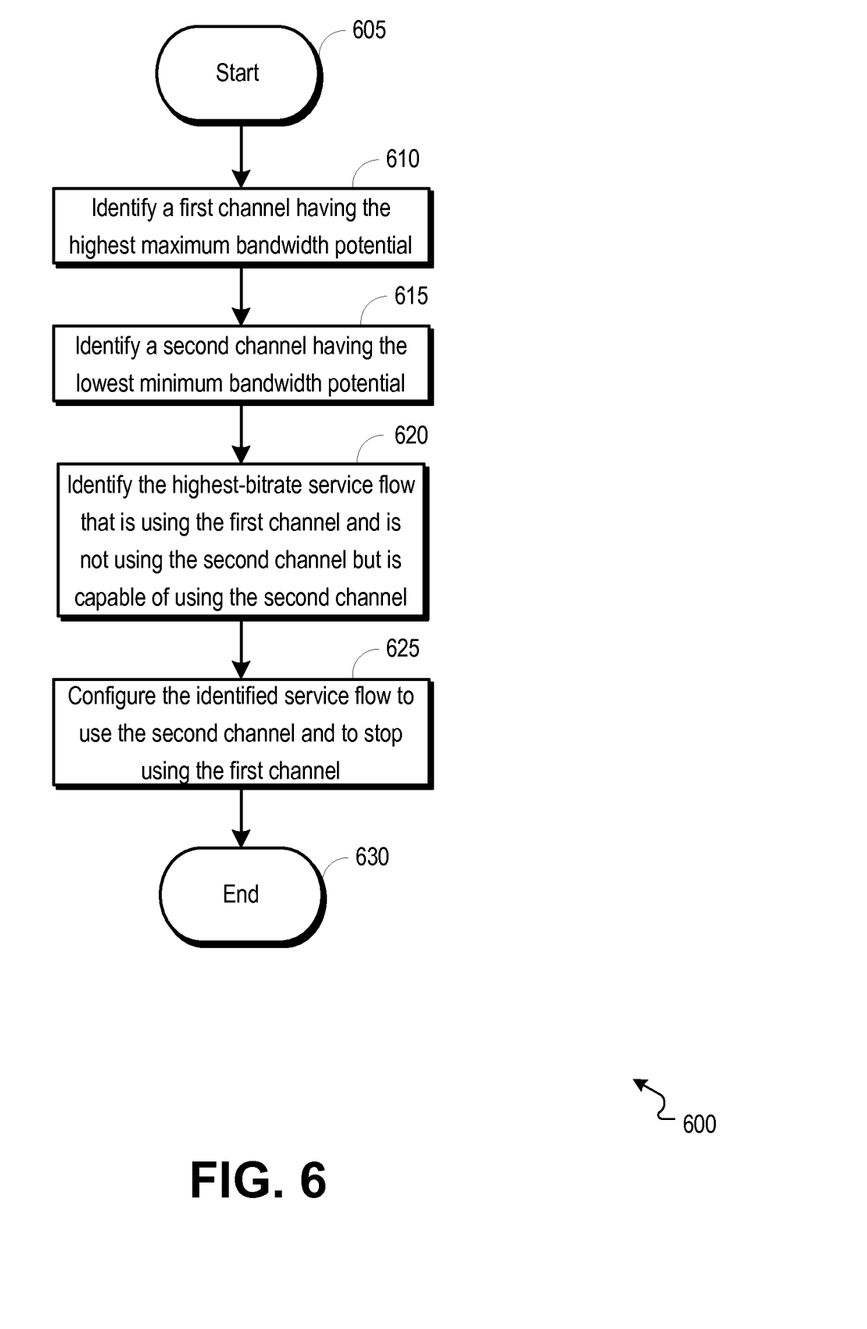
FIG. 6 is a flowchart illustrating an example process operable to perform load-balancing by moving a service flow from a channel having a relatively high maximum bandwidth potential to a channel having a relatively low minimum bandwidth potential.

FIG. 6 is a flowchart illustrating an example process 600 operable to perform load-balancing across a plurality of channels by periodically configuring a high-bitrate service flow using a channel having a relatively high maximum bandwidth potential to use a channel having a relatively low minimum bandwidth potential. The process 600 can begin at 605 when the determination is made to balance a load across a plurality of channels. In embodiments, the process 600 can be repeated until a predetermined condition on the plurality of channels is met. For example, the process 600 can be repeated until the minimum bandwidth potentials and/or the maximum bandwidth potentials of each of the plurality of channels are within a predetermined range of one another. In embodiments, the process 600 can be carried out periodically.

At 610, a first channel having the highest maximum bandwidth potential among a plurality of channels can be identified. The channel having the highest maximum bandwidth potential among a plurality of channels can be identified, for example, by a load balancer 235 of FIG. 2.

At 615, a second channel having the lowest minimum bandwidth potential among a plurality of channels can be identified. The channel having the lowest minimum bandwidth potential among a plurality of channels can be identified, for example, by a load balancer 235 of FIG. 2.

At 620, the highest-bitrate service flow that is using the first channel, that is not using the second channel, and that is capable of using the second channel can be identified. The high-bitrate service flow can be identified, for example, by a load balancer 235 of FIG. 2. In embodiments, it can be determined that a service flow is a high-bitrate service flow based upon a comparison between the service flow's average bitrate and average bitrates of other service flows or a predetermined threshold.

At 625, the identified service flow can be configured to use the second channel and to stop using the first channel. The identified service flow can be configured to use the second channel and to stop using the first channel, for example, by a bandwidth scheduler 215 of FIG. 2. In embodiments, a load balancer 235 can associate the identified service flow with the second channel and disassociate the identified service flow from the first channel. In embodiments, a bandwidth scheduler can configure the identified service flow to stop sending packets on the first channel and to send packets on the second channel. After the identified service flow is configured to use the second channel and to stop using the first channel, the process 600 can end at 630.

Figure 7:
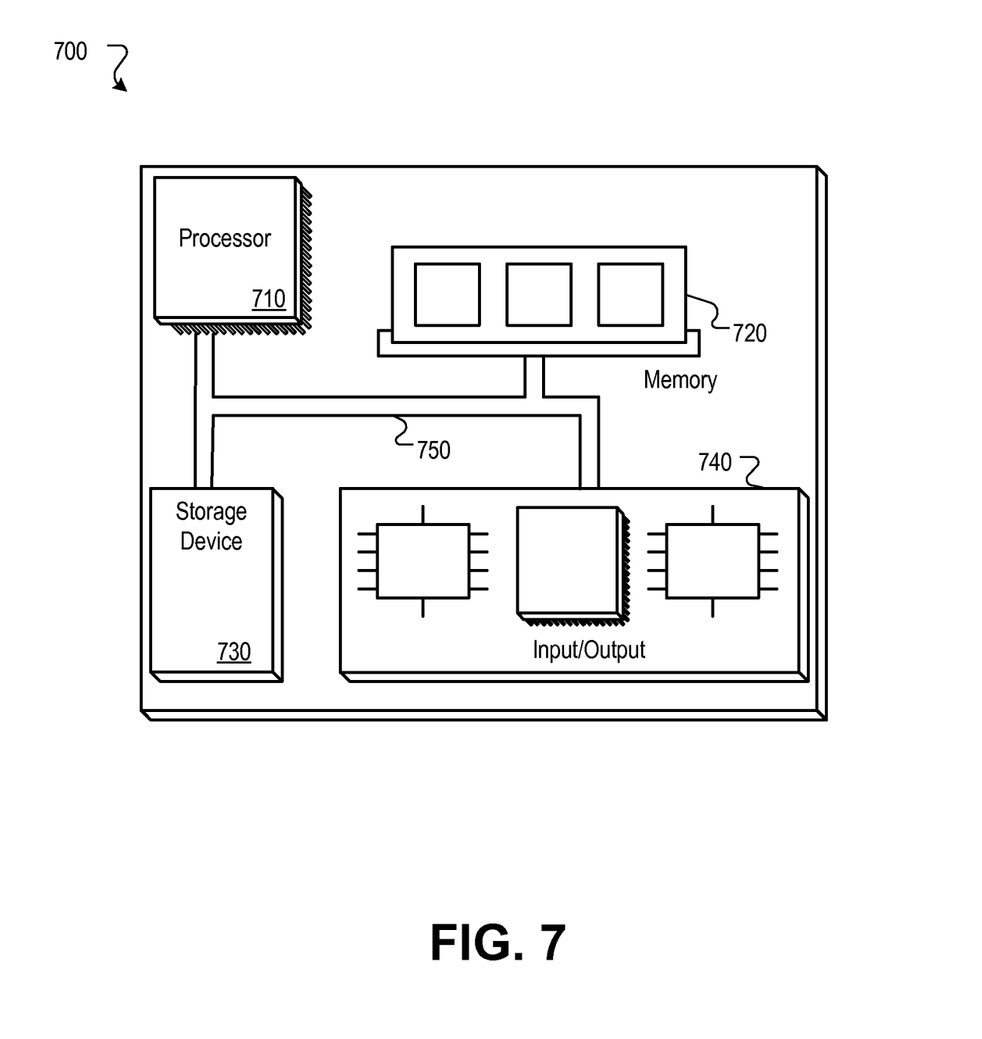
FIG. 7 is a block diagram of a hardware configuration operable to perform load-balancing across a plurality of channels based upon bitrates of service flows using the plurality of channels.

FIG. 7 is a block diagram of a hardware configuration 700 operable to perform load-balancing across a plurality of channels based upon a likelihood of a load imbalance occurring across the plurality of channels. It should be understood that the hardware configuration 700 can exist in various types of devices. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1, network(s) 125 of FIG. 1, etc.).

Those skilled in the art will appreciate that the invention improves upon methods and apparatuses for balancing a bandwidth load associated with one or more service flows across a plurality of channels. The methods, systems and apparatuses described in this disclosure enable load-balancing across a plurality of channels based upon a likelihood of a load imbalance occurring across the plurality of channels.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   determining a maximum bandwidth potential for each respective one channel of a plurality of channels, wherein the maximum bandwidth potential for the respective one channel comprises a sum of the bandwidth of each of two or more service flows that are capable of using the respective one channel;
   identifying a first channel, the first channel having the highest maximum bandwidth potential among the plurality of channels;
   identifying a service flow that is currently using the first channel;
   configuring the identified service flow to use a second channel, the second channel having a lower maximum bandwidth potential than the first channel;
   determining a minimum bandwidth potential for each respective one channel of the plurality of channels, wherein the minimum bandwidth potential for the respective one channel comprises a sum of average bandwidth allocations for each of two or more service flows that are capable of using the respective one channel, and wherein determining a minimum bandwidth potential for each of the plurality of channels comprises:
      determining an average bitrate for each of one or more service flows that are capable of using any one or more of the plurality of channels;
      initializing a minimum bandwidth potential at zero for each of the plurality of channels; and
      adding a fraction of the average bitrate of each of the plurality of service flows to the minimum bandwidth potential of each of the plurality of channels that the service flow can use, wherein the fraction of the average bitrate of each of the plurality of service flows is determined based upon the number of channels that the service flow can use;
   identifying a channel of the plurality of channels, the identified channel having the highest minimum bandwidth potential relative to the other channels of the plurality of channels;
   identifying one or more service flows, wherein the one or more identified service flows are currently using the identified channel; and
   configuring the one or more identified service flows to use a channel having a lower minimum bandwidth potential than the identified channel.

2. The method of claim 1, wherein the identified service flow has the highest bitrate relative to other service flows that are currently using the first channel.

3. The method of claim 1, wherein determining the maximum bandwidth potential for each of the plurality of channels comprises:
   determining an average bitrate for each of one or more service flows that are capable of using any one or more of the plurality of channels;
   initializing the maximum bandwidth potential for each of the plurality of channels to zero; and
   adding the average bitrate of each of the one or more service flows to the maximum bandwidth potential of each of the plurality of channels that the service flow can use.

4. The method of claim 1, further comprising:
   configuring one or more other service flows to use one or more of the plurality of channels so that the maximum bandwidth potentials for each of the plurality of channels are within a threshold range of each other.

5. The method of claim 1, wherein each step of the method is repeated until the minimum bandwidth potentials for each of the plurality of channels are within a threshold range of each other.

6. An apparatus comprising:
a bandwidth potential module configured to determine a minimum bandwidth potential for each respective one channel of a plurality of channels, wherein the minimum bandwidth potential for the respective one channel comprises a sum of average bandwidth allocations for each of two or more service flows that are capable of using the respective one channel, and wherein determining a minimum bandwidth potential for each of the plurality of channels comprises:
 determining an average bitrate for each of one or more service flows that are capable of using any one or more of the plurality of channels;
 initializing a minimum bandwidth potential at zero for each of the plurality of channels; and
 adding a fraction of the average bitrate of each of the plurality of service flows to the minimum bandwidth potential of each of the plurality of channels that the service flow can use, wherein the fraction of the average bitrate of each of the plurality of service flows is determined based upon the number of channels that the service flow can use;
a load balancing module configured to:
 identify a first channel from a plurality of channels, the first channel having the highest minimum bandwidth potential relative to the other channels of the plurality of channels; and
 identify one or more service flows, wherein the one or more identified service flows are currently using the first channel; and
a bandwidth scheduler operable to configure the one or more identified service flows to use a second channel having a lower minimum bandwidth potential than the first channel;
wherein the bandwidth potential module is further configured to determine a maximum bandwidth potential for each respective one channel of a plurality of channels, wherein the maximum bandwidth potential for the respective one channel comprises a sum of the bandwidth of each of two or more service flows that are capable of using the respective one channel;
wherein the load balancing module is further configured to:
 identify an over-utilized channel, the over-utilized channel having the highest maximum bandwidth potential among the plurality of channels; and
 identify a service flow that is currently using the over-utilized channel; and
wherein the bandwidth scheduler is further operable to configure the identified service flow to use a channel having a lower maximum bandwidth potential than the over-utilized channel.

7. The apparatus of claim 6, wherein the identified service flow has the highest bitrate relative to other service flows that are using the over-utilized channel.

8. The apparatus of claim 6, wherein determining the maximum bandwidth potential for each of the plurality of channels comprises:
 determining an average bitrate for each of one or more service flows that are capable of using any one or more of the plurality of channels;
 initializing the maximum bandwidth potential for each of the plurality of channels to zero; and
 adding the average bitrate of each of the one or more service flows to the maximum bandwidth potential of each of the plurality of channels that the service flow can use.

9. One or more non-transitory computer-readable media having instructions operable to cause one or more processors to perform the operations comprising:
 determining a maximum bandwidth potential for each respective one channel of a plurality of channels, wherein the maximum bandwidth potential for the respective one channel comprises a sum of the bandwidth of each of two or more service flows that are capable of using the respective one channel;
 identifying a first channel, the first channel having the highest maximum bandwidth potential among the plurality of channels;
 identifying a service flow that is using the first channel;
 configuring the identified service flow to use a second channel, the second channel having a lower maximum bandwidth potential than the first channel;
 determining a minimum bandwidth potential for each respective one channel of the plurality of channels, wherein the minimum bandwidth potential for the respective one channel comprises a sum of average bandwidth allocations for each of two or more service flows that are capable of using the respective one channel, wherein determining a minimum bandwidth potential for each of the plurality of channels comprises:
  determining an average bitrate for each of one or more service flows that are capable of using any one or more of the plurality of channels;
  initializing a minimum bandwidth potential at zero for each of the plurality of channels; and
  adding a fraction of the average bitrate of each of the plurality of service flows to the minimum bandwidth potential of each of the plurality of channels that the service flow can use, wherein the fraction of the average bitrate of each of the plurality of service flows is determined based upon the number of channels that the service flow can use;
 identifying a channel of the plurality of channels, the identified channel having the highest minimum bandwidth potential relative to the other channels of the plurality of channels;
 identifying one or more service flows, wherein the one or more identified service flows are currently using the identified channel; and
 configuring the one or more identified service flows to use a channel having a lower minimum bandwidth potential than the identified channel.

10. The one or more non-transitory computer-readable media of claim 9, the instructions being further operable to cause the one or more processors to perform the operations comprising:
 identifying a service flow that is using the second channel; and
 configuring the service flow that is using the second channel to use the first channel.

11. The one or more non-transitory computer-readable media of claim 9, wherein the identified service flow has the highest bitrate relative to other service flows that are using the first channel.

12. The one or more non-transitory computer-readable media of claim 9, wherein determining the maximum bandwidth potential for each of the plurality of channels comprises:
 determining an average bitrate for each of one or more service flows that are capable of using any one or more of the plurality of channels;

initializing the maximum bandwidth potential for each of the plurality of channels to zero; and adding the average bitrate of each of the one or more service flows to the maximum bandwidth potential of each of the plurality of channels that the service flow can use.

13. The one or more non-transitory computer-readable media of claim 9, the instructions being further operable to cause the one or more processors to perform the operations comprising:

configuring one or more other service flows to use one or more of the plurality of channels so that the maximum bandwidth potentials for each of the plurality of channels are within a threshold range of each other.

* * * * *